W. R. FLEMING.
LABORATORY APPARATUS.
APPLICATION FILED NOV. 7, 1918.
1,354,736.
Patented Oct. 5, 1920.
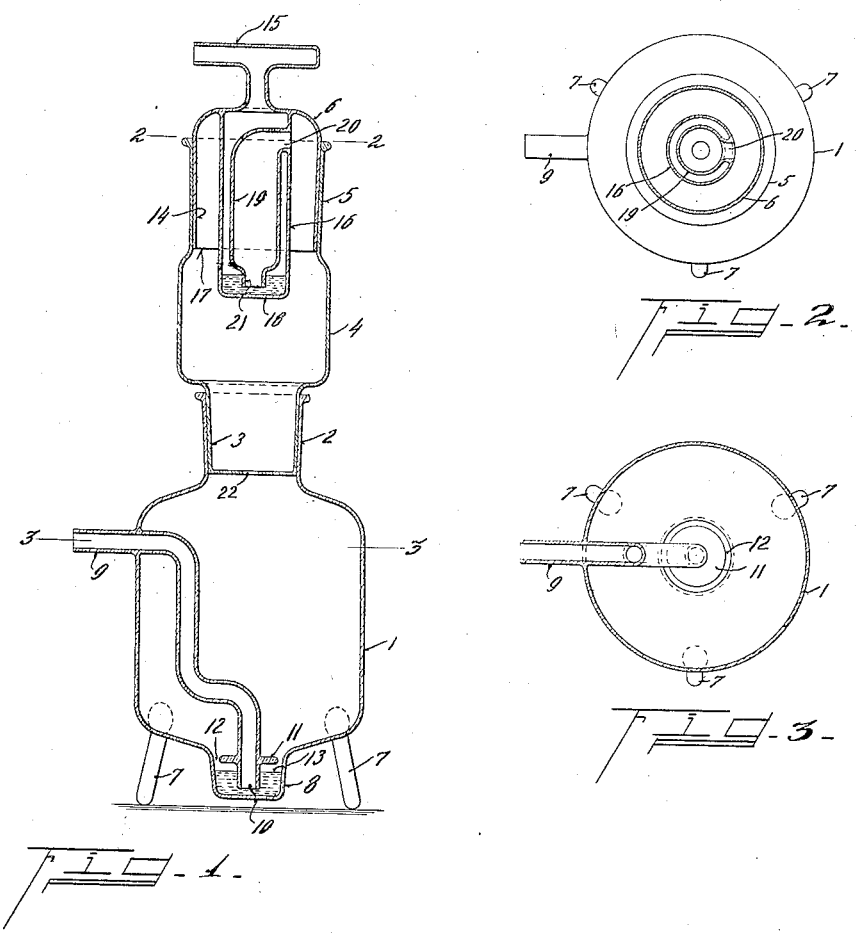

UNITED STATES PATENT OFFICE.

WILLIAM R. FLEMING, OF NEWPORT, KENTUCKY.

LABORATORY APPARATUS.

1,354,736.  Specification of Letters Patent.  Patented Oct. 5, 1920.

Application filed November 7, 1918. Serial No. 261,538.

*To all whom it may concern:*

Be it known that I, WILLIAM R. FLEMING, a citizen of the United States, and residing at Newport, in the county of Campbell and State of Kentucky, have invented a new and useful Improvement in Laboratory Apparatus, of which the following specification is a full disclosure.

My invention relates to a chemical apparatus for quantitative analysis, of the type commonly called an absorption tube, the most familiar example of its usage being in the work of determining the carbon in metal.

Such an apparatus has a chamber containing an absorbent body, such as soda lime, through which the gas is passed and the carbon absorbed into the body.

The loaded apparatus is weighed before and after the treatment and the amount of carbon dioxid, or other elemental gas component, is determined from the weight increment after absorption.

To obtain reliable results, such an apparatus should be adapted for a minimum amount of handling, and an object of the invention is to provide means for automatically preventing the escape or entrance of gases or moisture at either its inlet or outlet.

Another object of the invention is to provide means insuring the catching and positive retention of the gas component element to be determined.

Another object of the invention is to provide means subjecting the gas to a uniformly upward and diffused passage through the absorbent body.

Another object is to embody the principle in a simple, convenient and efficient structure.

One form of apparatus embodying the principle, capable of embodiment in various structural formations, is illustrated in the accompanying drawings, forming a part of this specification, in which Figure 1 is a central vertical section through one type of my absorption tube.

Fig. 2 is a plan section on line 2, 2, Fig. 1.

Fig. 3 is a plan section on line 3, 3, Fig. 1.

In the drawings, the apparatus is illustrated as comprising two communicating chambers through which the gas passes, a lower absorbent chamber 1, closed at the bottom and having a bottle-neck upper portion 2, into which telescopes the tube bottom projection 3, of the upper absorbent chamber 4. The bottom projection 3 is provided with a port or aperture 22 and the chamber member 4 terminates with a jar-neck upper open end 5 closed by a valve-stopper 6, the details of which will be later described.

Preferably the bottom member 1 rests firmly on legs 7 and the bottom of said member 1 has a central, downward tube or well projection 8, for forming a trap or gas-seal.

The gas enters the inlet tube 9 at the upper portion of member 1, and this tube projects downward interiorly of chamber 1, and has an open lower extremity 10 dipping into the well 8. This tube is formed with a flange 11 at the upper end of the well 8, forming an annular gas passage-way 12 opening upwardly into chamber 1, and this flange partially closing the opening prevents the absorbent particles from falling into the well 8. Mercury 13 is placed in the well 8 to seal the tube end 10, through which the gas bubbles in passing upwardly into chamber 1 and is mercury-sealed against a return flow. In the second vessel 4 is placed, if desired, a second absorbent body, as phosphoric acid, for absorbing the moisture liberated by the reactions in the lower chamber. The valve stopper member 6 for member 4 is also formed to constitute a mercury-seal gas outlet and comprises an outer tube or stopper member 14 for the jar-neck 5, terminating upwardly in a tubular gas outlet 15, having an enlarged diameter portion 16 extending downwardly below the open bottom end 17, of tube 14, and having a closed bottom end 18.

This forms an annular free gas conduit from chamber 4 to the upper end of tube 16 within stopper member 14, and this tube portion 16 has an interior tube 19, with inlet 20 at the upper end, the open lower end 21 of the inner tube 19 terminating just above the closed lower end 18 of tube portion 16. Mercury is placed in this tube portion 16 to seal the open bottom end of the inner tube 19, so that the gas from chamber 4 bubbles upwardly through the mercury and escapes at tube 15, through tube 16, being mercury-sealed against a return flow.

By means of these valve or mercury-seal inlets and outlets, no gas or moisture can get into or out of the apparatus, save the stream of gas directed through for absorption.

The loaded and weighed apparatus can, if desired, be placed on the scales and the gas subjected to the absorption process, requiring no manual handling and no stopcock manipulations.

By using this instrument, accurate results are invariably obtained with minimum manipulation, so that it constitutes a substantially automatic apparatus in practical operation.

The disclosed arrangement also enables the tube passages to and from the mercury seals to be packed with asbestos or cotton or the like, to prevent the reagents from getting into the mercury, also to prevent the mercury from flowing through the tubes.

*Directions for filling the apparatus.*

Pack the annular space between flange 11 (12) and body of 1 with moist cotton, using just enough to fill space. Over this place a small amount of asbestos, and then fill chamber 1 with the solid absorbent, such as soda lime, caustic soda or potash, caustic soda mixed with asbestos, etc., leaving about one-fourth inch below opening 22, which space is filled with asbestos. Pour just enough mercury into tube 9 at opening 3 to cover bottom of tube at 10. Then plug opening 3 of tube 9 with cotton to prevent losing of mercury through accident, upsetting, etc.

Then fill the upper chamber 4, as follows:

Around opening 20 pack a small quantity of dry cotton and then fill the remaining space between 16 and 14 with dry asbestos. Pour mercury into opening at 15 to form seal at 21. Plug the opening of 15 with dry cotton. Now fill small bottom portion of chamber 4 with asbestos and fill remainder of chamber with phosphoric anhydrid.

I claim:

1. A gas analysis apparatus, comprising a reagent vessel, adapted for absorbing gas, a gas inlet and outlet arranged for subjecting the gas flow to the reagent, and valve means therefor at the top and bottom rendering the flow uni-directional.

2. A gas analysis apparatus, comprising a reagent vessel, adapted for absorbing gas, an inlet and an outlet arranged vertically for subjecting the gas flow to the reagent, and mercury-seal devices for said inlet and outlet, rendering the gas flow uni-directional from the bottom to the top of the apparatus.

3. A gas analysis apparatus, comprising a gas-absorbing reagent vessel, a liquid seal gas inlet arranged for directing the gas to the reagent, and a liquid seal gas outlet for escaping the gas after reaction, said vessel being an upright apparatus with the inlet at the bottom and the outlet at the top.

4. A gas analysis apparatus, comprising communicating reagent vessels, one filling the other stopper-like, a gas inlet to one of the vessels, a mercury-seal controlling said inlet, and a mercury-seal gas outlet device fitting the other vessel stopper-like, enabling the vessels to be charged with the reagent.

5. A gas analysis apparatus comprising a gas vessel formed with a bottom depression, a gas inlet conduit into said vessel, having its lower end terminating in said depression, constituting a provision for mercury-sealing the inlet.

6. A gas analysis apparatus comprising a gas vessel formed with a depression in the bottom, an inlet tube through a wall of said vessel, the lower end of which terminates in said depression, arranged to constitute a mercury-seal for the gas inlet, there being a flange on said inlet tube partially roofing said depression and providing an annular passage-way for the gas to the reagent.

7. A gas analysis apparatus comprising a gas vessel having an open mouth, a hollow stopper-member therefor, and an outlet through the stopper member, and communicating tube members arranged for forming a mercury seal to prevent the back flow of the gas into said stopper member.

8. A gas analysis apparatus, comprising a first reagent vessel, a superposed reagent vessel fitting the first vessel stopper-like, a mercury-seal gas outlet member fitting the superposed member stopper-like, and a mercury-seal gas inlet member formed in the bottom of said first member.

In witness whereof, I hereunto subscribe my name, as attested by the two subscribing witnesses.

WILLIAM R. FLEMING.

Witnesses:
CLARENCE B. FOSTER,
L. A. BECK.